(12) United States Patent
Johnson

(10) Patent No.: US 6,898,761 B2
(45) Date of Patent: May 24, 2005

(54) EXTENSIBLE MARKUP LANGUAGE GENETIC ALGORITHM

(75) Inventor: Judith A. Johnson, Lawrenceville, NJ (US)

(73) Assignee: Raytheon Company, Waltham, MA (US)

( * ) Notice: Subject to any disclaimer, the term of this patent is extended or adjusted under 35 U.S.C. 154(b) by 729 days.

(21) Appl. No.: 09/846,158

(22) Filed: Apr. 30, 2001

(65) Prior Publication Data

US 2001/0037346 A1 Nov. 1, 2001

Related U.S. Application Data

(60) Provisional application No. 60/200,939, filed on May 1, 2000, and provisional application No. 60/207,480, filed on May 25, 2000.

(51) Int. Cl.[7] .......................... G06F 17/21; G06F 15/18; G06N 3/12
(52) U.S. Cl. ...................... 715/513; 706/13; 707/104.1; 715/514; 715/522
(58) Field of Search ............................ 706/11, 12, 13; 707/5; 700/28

(56) References Cited

U.S. PATENT DOCUMENTS

| | | | |
|---|---|---|---|
| 5,930,780 A | 7/1999 | Hughes et al. | 706/13 |
| 6,088,690 A | 7/2000 | Gounares et al. | 706/13 |
| 6,249,714 B1 | 6/2001 | Hocaoglu et al. | 700/97 |
| 6,263,325 B1 | 7/2001 | Yoshida et al. | 706/12 |
| 6,629,097 B1 * | 9/2003 | Keith | 707/5 |
| 2002/0042784 A1 * | 4/2002 | Kerven et al. | 706/12 |
| 2003/0083756 A1 * | 5/2003 | Hsiung et al. | 700/28 |
| 2003/0109951 A1 * | 6/2003 | Hsiung et al. | 700/108 |
| 2003/0144746 A1 * | 7/2003 | Hsiung et al. | 700/28 |

OTHER PUBLICATIONS

Wallace et al., "Haskell and XML: Genetic Combinators or Type-Based Translation?", International Conference on Functional Programming, 1999.*
Royappa, "Implementing Catalog Clearinghouses with XML and XSL", Proceedings of the 1999 Symposium on Applied Computing, 1999.*
Rabarijaona, "Building and Searching an XML-Based Corporate Memory", IEEE Intelligent Systems, May 2000.*
Abiteboul, "On Views and XML", SIGMOD Record, Dec. 1999.*
Joseph et al., "Design of a Parallel Genetic Algorithm For The Internet", 1997 Conference on Communications, Power and Computing, May 1997.*
Carmel et al., "XML and Information Retrieval: A SIGIR 2000 Workshop", ACM SIGIR Forum, Apr. 2000.*
Katayama et al., "A New Iterated Local Search Algorithm Using Genetic Crossover for the Traveling Salesman Problem", Proceedings of the 1999 ACM Symposium on Applied Computing, 1999.*

(Continued)

Primary Examiner—Anthony Knight
Assistant Examiner—Michael B. Holmes
(74) Attorney, Agent, or Firm—Baker Botts L.L.P.

(57) ABSTRACT

A method for interfacing a genetic search algorithm to the web environment of the Internet comprises initially defining data elements, attributes and rules for use thereof for an extensible markup language. The extensible markup language is stored in a document type definition file (DID). Data is described in a document in a hierarchical format utilizing the stored extensible markup language. The data is imported from the document to the genetic algorithm to define a data string or an "individual" in a population of points.

24 Claims, 6 Drawing Sheets

OTHER PUBLICATIONS

Chen et al., "Intelligent Spider for Internet Searching", Proceedings of the 13th Hawaii International Conference on System Sciences, Jan. 1997.*

DeRose, "XML Linking", ACM Computing Surveys, Dec. 1999.*

Gogan et al., "The Use of Neural Networks for Structural Search on Web", Proceedings of the 10th Edition of the International Symposium on System Theory, May 2000.*

Goldman et al., "WSQ/DSQ: A Practice Approach for Combined Querying of Databases and the Web", Proceedings of the 200 ACM SIGMOD International Conference on Management of Data, 2000.*

Dix, "Interactive Querying Locating and Discovering Information", Second Workshop on Information Retrieval and Human Computer Interaction, Sep. 1998.*

Buraga et al., "An XML–Based Query Language Used in Structural Search Activity on Web", Transactions on Automatic Contro and Computer Science, vol. 45, No. 3, 2000.*

Ciancarini et al., "Managing Complex Documents Over the WWW: A Case Study for XML", Department of Computer Science, University of Bologna, Retrieved from the Internet: http://citeseer.ist.psu.edu/ciancarini99managing.html, Apr. 1999.*

Kendall et al., "Information Delivery Systems: An Exploration of Web Pull and Push Technology", Communcations of the Association for Information Systems, vol. 1, paper 14, Apr. 1999.*

International Search Report dated Jun. 4, 2002 for PCT/US01/14077 filed May 1, 2001.

PCT International Search Report dated Sep. 12, 2002 for PCT/US01/14077 filed May 1, 2000.

* cited by examiner

```
<!ELEMENT GAIndividual (bitString)
<!ELEMENT bitString (#PCDATA)>

<GAIndividual>
    < bitString >01110000110100011</bitString>
</GAIndividual>
```

```
<!ELEMENT GAIndividual (TSPLeg*)>
<!ELEMENT TSPLeg ( TSPLeg*, PCDATA)>
```

FIG. 4

```
<!ELEMENT GAParams (PopulationSize, GABinaryVariable+, MaxGenerations,
     NumVariables, CrossoverType, CrossoverProbability,
     MutationProbability, OutputFilename, SelectionType,
     MatingPoolChoice, Cmult, DTDName, DTDFileName traditionalProb )>
<!ELEMENT PopulationSize (#PCDATA)>
<!ELEMENT GABinaryVariable (MinBinaryValue, MaxBinaryValue, DivideBy,
     VarNodeName, CrossNodeProbability, BinaryProbability)>
<!ELEMENT MinBinaryValue (#PCDATA)>
<!ELEMENT MaxBinaryValue (#PCDATA)>
<!ELEMENT DivideBy (#PCDATA)>
<!ELEMENT VarNodeName (#PCDATA)>
<!ELEMENT CrossNodeProbability (#PCDATA)>
<!ELEMENT BinaryProbability (#PCDATA)>
<!ELEMENT MaxGenerations (#PCDATA)>
<!ELEMENT NumVariables (#PCDATA)>
<!ELEMENT CrossoverType (#PCDATA)>
<!ELEMENT MutationProbability (#PCDATA)>
<!ELEMENT OutputFilename (#PCDATA)>
<!ELEMENT SelectionType (#PCDATA)>
<!ELEMENT MatingPoolChoice (#PCDATA)>
<!ELEMENT Cmult (#PCDATA)>
<!ELEMENT DTDName (#PCDATA)>
<!ELEMENT DTDFileName (#PCDATA)>
<!ELEMENT traditionalProb (#PCDATA)>
```

FIG. 7

1. $f1(x_i) = \sum x_i^2$, $i = 1..3$, $-5.12 \leq x_i \leq 5.12$
2. $f2(x_1, x_2) = 100 * (x_1^2 - x_2)^2 + (1 - x_1)^2$, $-2.048 \leq x_i \leq 2.048$
3. $f3(x_i) = \sum \text{Integer}(x_i)$, $i = 1..5$, $-5.12 \leq x_i \leq 5.12$
4. $f4(x_i) = \sum i(x_i)^4 + \text{Gauss}(0,1)$, $i = 1..30$, $-1.28 \leq x_i \leq 1.28$
5. $f4(x_i) = .002 + \sum_j (1/(j + \sum_i (x_i - a_{ij})^6))$, $i = 1..2$,
   $j = 1..25$, $-65.536 \leq x_i \leq 65.536$

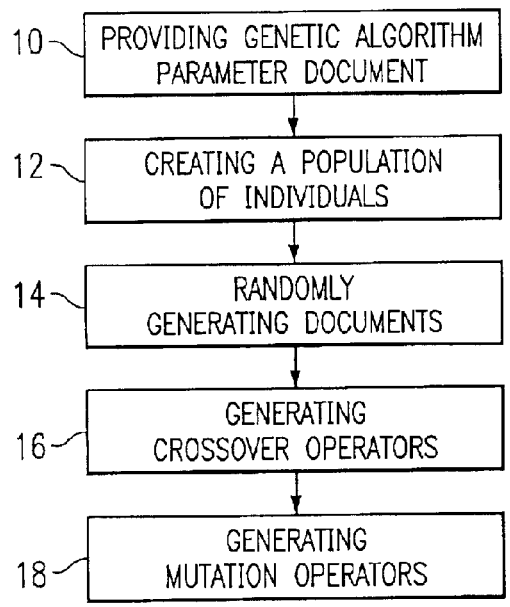
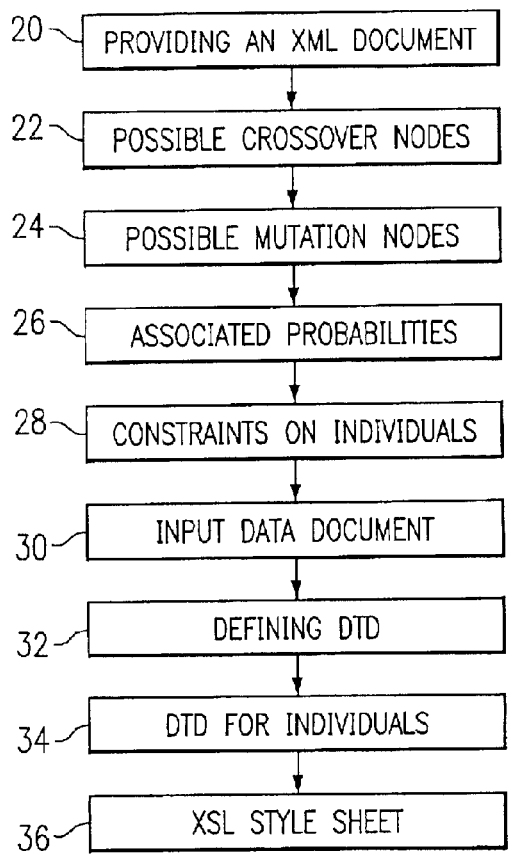
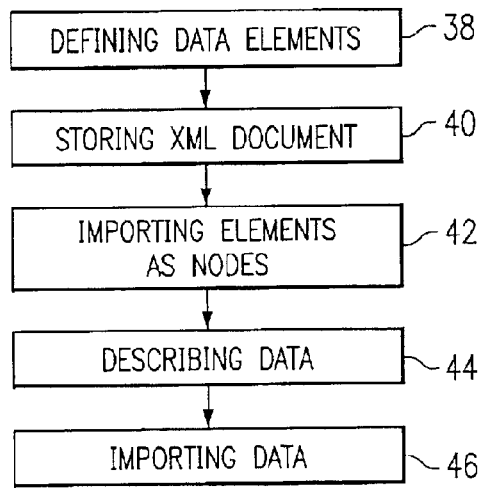

FIG. 8

```xml
<!DOCTYPE GAParams SYSTEM "GAParams.dtd">
<GAParams>
    <PopulationSize>50</PopulationSize>
    <GABinaryVariable>
        <MinBinaryValue>-512</MinBinaryValue>
        <MaxBinaryValue>511</MaxBinaryValue>
        <DivideBy>100</DivideBy>
        <VarNodeName>xone</VarNodeName>
        <CrossNodeProbability>.2</CrossNodeProbability>
        <BinaryProbability>.50</BinaryProbability>
    </GABinaryVariable>
    <GABinaryVariable>
        <MinBinaryValue>-512</MinBinaryValue>
        <MaxBinaryValue>511</MaxBinaryValue>
        <DivideBy>100</DivideBy>
        <VarNodeName>xtwo</VarNodeName>
        <CrossNodeProbability>.2</CrossNodeProbability>
        <BinaryProbability>.50</BinaryProbability>
    </GABinaryVariable>
    <GABinaryVariable>
        <MinBinaryValue>-512</MinBinaryValue>
        <MaxBinaryValue>511</MaxBinaryValue>
        <DivideBy>100</DivideBy>
        <VarNodeName>xthree</VarNodeName>
        <CrossNodeProbability>.2</CrossNodeProbability>
        <BinaryProbability>.50</BinaryProbability>
    </GABinaryVariable>
    <MaxGenerations>60</MaxGenerations>
    <NumVariables>3</NumVariables>
    <CrossoverType>1</CrossoverType>
    <CrossoverProbability>.60</CrossoverProbability>
    <MutationProbability>.001</MutationProbability>
    <OutputFilename>d1outfile.txt</OutputFilename>
    <SelectionType>0</SelectionType>
    <MatingPoolChoice>0</MatingPoolChoice>
    <Cmult>1.2</Cmult>
    <DTDName>DeJongOneIndividual</DTDName>
    <DTDFileName>DeJongOneIndividual.dtd</DTDFileName>
    <traditionalProb>.0</traditionalProb>
</GAParams>
```

EXTENSIBLE MARKUP LANGUAGE GENETIC ALGORITHM

RELATED APPLICATIONS

This application claims the benefit of U.S. provisional application Ser. No. 60/200,939, filed May 1, 2000, entitled Extensible Markup Language Genetic Algorithm, and U.S. provisional application Ser. No. 60/207,480, filed May 25, 2000, entitled Extensible Markup Language Genetic Algorithm.

TECHNICAL FIELD OF THE INVENTION

This invention relates to a randomized parallel search algorithm that searches from a population of points, and more particularly to an extensible markup language genetic algorithm using customizable tags to define data.

BACKGROUND OF THE INVENTION

Given the proliferation of use of the Internet, there is a need to build an interface between a genetic algorithm and the Internet. A genetic algorithm is a randomized parallel search algorithm that searches from a population of points normally consisting of a bit string encoded to represent the data or individuals of a population. The genetic algorithm proceeds by evaluating and modifying the strings utilizing genetic operators such as selection, crossover, and mutation. The conventional genetic algorithm uses a bit string to encode the individuals in its population. As a result, the amount and complexity of the data that can be encoded is limited. It also means that the individual of a population, which comprises the solution of the problem, is not human readable. The individual needs to be translated back into a solution understandable by the user. This means that the genetic algorithm is a "black box" and is an intermediate solution not human readable. Thus, there is a need for an improved interface between a genetic algorithm and the Internet.

SUMMARY OF THE INVENTION

In accordance with the present invention there is provided a method for interfacing a genetic search algorithm to the web environment of the Internet. The interfacing is initialized by defining data elements, attributes and rules for use thereof for an extensible markup language. The extensible markup language is stored in a document type definition file. The stored extensible markup language is utilized to describe data in a document in the hierarchical format. This data in the document is imported to a genetic algorithm to define a data string or an individual in a population of points.

Further, in accordance with the present invention, the method for interfacing a genetic search algorithm to the web environment comprises providing a genetic algorithm parameter document containing input data for creating a population of individuals from the input data. Documents conforming to the genetic algorithm individual DTD are randomly generated and utilities are provided for performing crossover operators and/or mutation operators.

Further, the method for interfacing an extensible markup language genetic search algorithm to the web environment of the Internet comprises providing a parameter document identifying constraints for the created individuals.

Also in accordance with the present invention, the method for interfacing a genetic search algorithm to the web environment of the Internet comprises providing utilities for performing one or more of the operators from the group comprising: crossover, mutation, permutation, editing, encapsulation, and documentation.

The method of the present invention provides constraints for created "individuals", the constraints comprise one or more from the group of: uniqueness, completeness, and maximum and minimum values for nodes that contain text data.

An advantage of the method of the present invention is to minimize the difficulty of encoding complex data as a bit string and instead providing an XML data type definition for describing data in a hierarchical manner. By utilizing elements of a document type definition (DTD), which elements comprise nodes of an XML tree, crossover operators are enabled to perform at nodes rather than at one fixed point in a string. A further technical advantage of the method of the present invention is the potential for "individuals" of a document to have dynamically changing length, that is, the number of nodes of a particular type can vary.

BRIEF DESCRIPTION OF THE DRAWINGS

For a more complete understanding of the present invention and the advantages thereof, reference is now made to the following description taken in connection with the accompanying drawing.

FIG. 4 is a table of a genetic algorithm parameter document type definition;

FIG. 5 is a flowchart for creating populations of "individuals" from input data supplied in a genetic algorithm parameter document;

FIG. 6 is a flowchart of a method for creating a genetic algorithm for solving a problem utilizing an Internet standard for data definition;

FIG. 7 is an illustration of five DeJong functions used to test the properties of the extensible markup language genetic algorithm of the present invention;

FIG. 8 is an XML document as an input to the first function of FIG. 7;

FIG. 12 is a flowchart illustrating a method for interfacing a genetic search algorithm to the web environment of the Internet.

DETAILED DESCRIPTION OF THE INVENTION

A Genetic Algorithm (GA) is a randomized parallel search algorithm that searches from a population of points. Genetic algorithms provide an efficient tool for searching large and poorly understood spaces, and have been applied successfully to many NP-hard problems. A genetic algorithm works with a population of "individual" potential solutions encoded in some way, usually as bit strings. It proceeds by evaluating and modifying the strings using the genetic operators of selection, crossover, and mutation. The classical genetic algorithm begins with a random population of strings. Evaluation of each solution string is based on a fitness function that is problem dependent. This fitness function determines individuals in the population that provide better solutions to the problem. The classical genetic algorithm uses roulette wheel selection, which is a probabilistic method of choosing the fittest "individuals" for mutation and crossover; the most fit strings are chosen more often in direct correspondence to their relative fitness.

Figures 1, 2, 3:
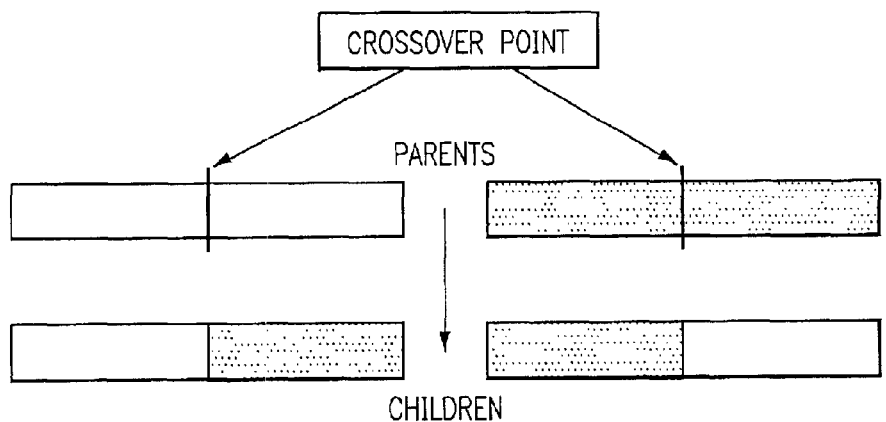
FIG. 1 is an illustration of a traditional one-point crossover of a conventional genetic algorithm.
FIG. 2 is an illustration of a bit string for a genetic algorithm.
FIG. 3 is an illustration of a traveling salesman problem solution defined as made up by the number of sub-leg solutions.

The crossover operation allows for information exchange between two individuals in the population. Traditional one-point crossover is implemented by randomly choosing a crossover point in the selected "individuals" and exchanging complementary substrings, as shown in FIG. 1. Selection according to fitness combined with crossover provides the main power behind the genetic algorithm. The selection operator is known to cause the loss of genetic material, thus decreasing the exploration of the search space, causing premature convergence. Mutation operators guard against this by periodically, with low probability, flipping a bit position in the string.

The conventional genetic algorithm uses a bit string to encode the "individuals" in the identified population. Because of this, the amount and complexity of the data that can be encoded is limited. It also means that the "individual", which comprises the solution of the problem, is not human readable. It needs to be translated back into a solution to be understood by the user. It also means that the genetic algorithm is a "black box"; intermediate solutions are also not human readable.

Extensible markup language (XML) provides syntax for developing specialized markup languages, to add identifiers, or tags to certain characters, words, or phrases in a document so as to enable recognition and action during processing. Marking up a document or data results in the formation of a hierarchical container that is platform, language and vendor independent and separates the content from the environment. Unlike HTML, which uses tags to define the presentation of data, XML allows the user to define tags to identify the data. Presentation of that data is irrelevant to the XML document. Extensible markup language is a recommendation of the World Wide Web Consortium (W3C); thus XML is not only a clever means of tagging data, it is an Internet standard of tagging data. XML provides a format that represents both structured and unstructured data; XML can represent data found in traditional sources such as databases and applications and also data found in non-traditional sources like word processing documents and spreadsheets.

Defining a markup language involves defining the data elements, attributes, and rules for their use. In XML, this is currently stored in a Document Type Definition (DTD). A well-formed and valid XML document conforms to the referenced DTD. Extensible markup language is a character based format, and tags can be named in the DTD with understandable strings so that the resulting documents are human readable. XML provides a simple means of representing tree-structured data. Because the DTD is a hierarchical definition, a DTD is inherently tree-like. Although XML is simple, it is also powerful enough to represent complex data structures. The XML standard includes the extensible style sheet language (XSL), which defines transformations from one XML document type to another. This allows an XML document to be easily converted into an HTML document or an XML document that conforms to a different DTD.

XML is gaining wide industry support from vendors like Oracle, IBM, Sun, Microsoft, Netscape, SAP and others as a platform and application neutral means of exchanging data. For example, Oracle has included core XML support, to tightly integrate XML with database data, processing data together on the same server.

In addition to XML, Java™ has become the ubiquitous language of the World Wide Web. The XML genetic algorithm of the present invention provides a Java API for genetic algorithm development. The XML GA fitness function will be implemented as a Java interface. Almost any evaluator that implements this interface is usable with the XML GA of this invention. The name of this class will be supplied to the XML GA as a parameter. Objects of the class can be instantiated using the Java introspection classes and methods. Thus an applet can be written that would read XML input documents, and use an evaluator class that exists on the client computer. This XML GA will be a generic genetic, algorithm that allows the user to specify the fitness and input data using an Internet standard. Genetic algorithm utilities will be a part of the API to perform different types of GA operators conforming to the requirements of the input document.

In Genetic Programming (GP) the "individuals" that make up the population are programs, organized into tree structures. The crossover operator works on the nodes of the tree, rather than on one point in a string as in the traditional genetic algorithm. Mutation operators in the XML GA would also be based on the mutation operator of Genetic Programming. Mutation operators in Genetic Programming can be performed either at an internal or external node of the tree. A GP mutation operator involves removing whatever is at the current node and substituting a randomly generated sub-tree. Other GP related operators are permutation, editing, encapsulation, and decimation. A permutation operator is a generalization of the inversion operator in genetic algorithms, and involves re-ordering the characters found between two selected points of a single "individual". Editing operators in genetic programming provides a means of simplifying the resulting program. This operator recursively applies a pre-established set of editing rules to each "individual" member of the population. This provides a means of ridding "individuals" of redundant information, and, in the case of GP, bits of code that perform no function. For example (X or X) can be converted to X. The encapsulation operator provides a means of identifying and naming potentially useful sub-trees so as to enable referencing for use later. Decimation operators provide a means of ridding the population of low-fitness "individuals" in cases where the population becomes skewed, and has a high proportion of such "individuals". A percentage of the population is removed and selection and crossover are performed to replenish the population.

One of the problems with the traditional genetic algorithm is the difficulty of encoding complex data as a bit string. The XML data type definition provides a means of describing data in a hierarchical manner. The DTD describes a data definition tree. The genetic algorithm "individual" in accordance with the present invention is modeled as an XML tree of data, allowing for complex data definitions. Using tree-based crossover operators and mutation operators similar to those used in genetic programming, an XML document can be used to define the "individuals" in the genetic algorithm population.

These genetic programming operators will be extended for use with an XML document as an "individual" in a genetic algorithm to provide a means of defining more complex yet readable "individuals" for the GA population. The elements of a document type definition are the nodes of the XML tree; as in genetic programming, crossover operators can be performed at these nodes rather than at one fixed point in a string. A simple bit string GA can be represented by creating an "individual" document with only one text node that contains a bit string as its data. An example of this is illustrated in FIG. 2.

Because of the way that document type definitions are defined, it is possible for the "individual" to have a dynamically changing length; the number of nodes of a particular type can vary. This is useful in several types of problems. For example, referring to FIG. 3, a traveling salesman problem solution could be defined as being made up of a number of sub-leg solutions.

A traveling salesman problem leg (TSPLeg) contains one city while another TSPLeg is made up of several cities. This allows the genetic algorithm to perform crossover operators while maintaining high fitness legs of a tour. The number of legs in an "individual" can change dynamically as can the number of legs in each leg of the "individual". Individuals of a population will be selected for crossover based on fitness in the traditional manner.

The XML GA mutation operator will also be similar to the GP mutation operator. XML elements that contain other elements are considered as internal nodes, while text nodes are similar to the external nodes. In the XML tree, a randomly generated element that conforms to the DTD can be substituted at the selected node. For the simple example of the bit string shown in FIG. 2, the traditional bit-wise mutation operator could also be used.

The permutation operator is also useful. For example, in the TSP problem of FIG. 3, the TSPLegs that comprise an "individual" could be re-ordered, or a TSPLeg could be chosen and the elements inside that node are re-ordered. Editing operators are used in an XML GA to force "individuals" to conform to constraints in problems like the TSP. In the example of the TSP, an encapsulation operator identifies high fitness TSPLegs. The XML GA will have a document type definition that allows the user to define how to use the constraint information and also what the fitness function is in an XML document. An example of such a DTD is shown in FIG. 4. An XML document that conforms to this DTD specifies the data nodes for the problem, the probability of crossover at that node, probability of performing crossover on the binary string contained in the node; and minimum and maximum values for the data at this node.

Other genetic algorithm parameters such as mutation probability, selection type, number of generations, and number of "individuals" in the population can also be specified in an XML document that conforms to a DTD. The DTD is expandable to allow for the inclusion of fitness equations and even fitness functions. Using the XML document derived from such a DTD, a fitness evaluator code is generated and the class used with the basic GA classes to form the genetic algorithm.

Referring to FIG. 5, the XML GA of the present invention creates a population of "individuals" in a routine 12 from the input data supplied in the genetic algorithm parameter document provided in routine 10, the document conforming to the GA Parameter DTD. These "individuals" are themselves XML documents that conform to the DTD specified for the "individual". The XML GA of the present invention includes a utility that provides a means of randomly generating documents in a routine 14 that conform to the genetic algorithm individual DTD. The elements in the documents may need to conform to other constraints, for example, the TSP "individual" needs to conform to the constraint that each city can only be visited once per "individual".

The crossover operator generated in routine 16 at different nodes may vary. Unlike the genetic programming crossover, where the entire subtree is switched, the XML GA requires flexibility as to which part of the element is crossed over. The XML GA "individual" can be a combination of the traditional bit string genetic algorithm within a more complex XML document. The text or external nodes, for example, are bit strings whose genetic operators are the traditional bit-wise crossover operator generated at routine 16 and mutation operator generated at routine 18. The internal nodes may be recursive as in the case of the TSP example, or the internal nodes may contain other types of data. The TSP example conforms very well with traditional genetic programming crossover operator, while other problems possibly require more complex rules for crossover operators. The XML GA crossover and mutation utilities must be flexible enough to deal with different types of documents.

The XML genetic algorithm API has utilities that perform crossover and mutation for differing types of nodes. A bit-wise crossover operator and a tree-node crossover operator are similar to the traditional genetic algorithm and genetic programming techniques. A crossover operator for nodes that can only be crossed with other nodes of the same type involves switching the node completely, or require farther crossover of the text data within the node, or require editing in the case of problems that include constraints. The simple GP-like crossover can also be extended to deal with the constraints of the problem being solved.

Constraints may be specified as input to the genetic algorithm in the form of another XML document. These other XML documents will follow the specification of another DTD that allows for constraints to be specified. The XML GA of the present invention resulting from the method of FIG. 5 includes random document generation, crossover, and mutation operators that use the constraints defined in the input XML document to generate "individuals" that conform to the constraints. Typical constraints that may be defined include uniqueness, completeness and maximum and minimum values for nodes that contain text data. The TSP problem, for example, requires that the "individuals" meet both uniqueness and completeness constraints—all of the cities must be represented and each city can only be represented once. Maximum and minimum constraints for the possible values at a node are typical requirements. These types of constraints occur in enough problems to require a GA with utilities for individual generation and reproduction.

Other information required by a genetic operator is a fitness function. The input document to the XML genetic algorithm may include the name of an evaluator class that implements the evaluator interface for the XML GA. Java™ allows fitness evaluators that implement the evaluator interface to be used generically with the XML genetic algorithm. Thus, all of the data required to produce a genetic algorithm is provided in the GA Parameter XML document. This means that the genetic algorithm is automatically generated to solve the problem, once the XML document that defines the constraints and fitness is created. As long as this document conforms to the DTD required by the genetic algorithm, the XML GA will function to solve the problem.

Referring to FIG. 6, any input data to the XML GA may also be provided in an XML document. For the TSP example of FIG. 3, this data would be the cities and distances between them. An XSL style sheet is typically used to instruct the genetic algorithm how to construct an "individual" from the provided data document. Thus the user provides several documents, an XML document as provided in routine 20 that conforms to the GA parameter DTD, specifying the fitness function, the possible crossover node created in routine 22 and mutation node created in routine 24 and associated probabilities from routine 26, and any constraints on the resulting "individuals," from routine 28. An input data document created in routine 30 and the defining DTD created from routine 32 will also be required, as well as a DTD for the "individuals" generated from routine 34 making up the population and an XSL style sheet from routine 36 to map the input data to the "individual." If all of these are present, a genetic algorithm for solving a problem is desirable using an Internet standard for data definition.

Note, the order of creating the several documents is not a controlling factor. The order of presentation in the various figures is by way of example and not by way of limitation.

An XML genetic algorithm in accordance with the present invention was implemented using nodes that contain binary string data similar to the traditional genetic algorithms. This XML GA was tested against the five De Jong functions. Karl DeJong used these functions to test the properties of genetic algorithms in early work. The five functions are described in FIG. 7.

The tested XML GA utilized the DTD specified earlier to define the input parameters to solve each of these functions. All were attempted using traditional genetic algorithm methods and then the XML GA was run for the same problem. Each type of GA was run using traditional Roulette selection and an elite selection based on a CHC elite selection operator. This elite selection involves using probabilistic selection to choose "individuals" for crossover and mutation in the normal way. New "individuals" are created in the usual manner using crossover and mutation. The new population created is combined with the old population, doubling the population size, sorted by fitness and the "n" best "individuals" are kept for the next generation, where "n" is the population size. The probability of crossover used for Roulette selection was W/o, and mutation 1%, and the probability of crossover for Elitist select was 95%, and mutation 5%. Each type of genetic algorithm was run 25 times using different random seeds.

The XML document shown in FIG. 8 was used as input for the first function. The GABinary Variable elements define the variables for the functions. Each has a minimum and maximum value expressed as an integer, along with a divide by value for conversion to a real value. The binary string length is calculated by the genetic algorithm based on these parameters. The XML GA of the present invention uses a Roulette strategy to select a node for crossover, when the CrossNode Probability is equal for all nodes, one of the variable nodes is selected with the probability of selecting any particular node equal. The BinaryProbability is the probability of performing a traditional one-point crossover on the binary string within the binary node. In this case, the text string is crossed with a 50% probability, otherwise the nodes are exchanged between two individuals.

Potential applications for the XML GA of this invention include mining data found on the Internet. Since XML is becoming a standard for defining data that will be found on the web, an XML based genetic algorithm will be able to search this data for interesting concepts. The XML GA will also be useful for co-evolution problems. Crossover and mutation operators can be performed for the different nodes independently, yet the XML document structure keeps nodes together or recombines nodes. An example of such a problem is behavior learning tasks where complex behavior can be decomposed into simpler sub-behaviors. The nodes of the XML document naturally describe interacting subcomponents that are dependent on each other. The XML GA also has applications in the area of combining a long term memory with the genetic algorithm.

Figure 9:
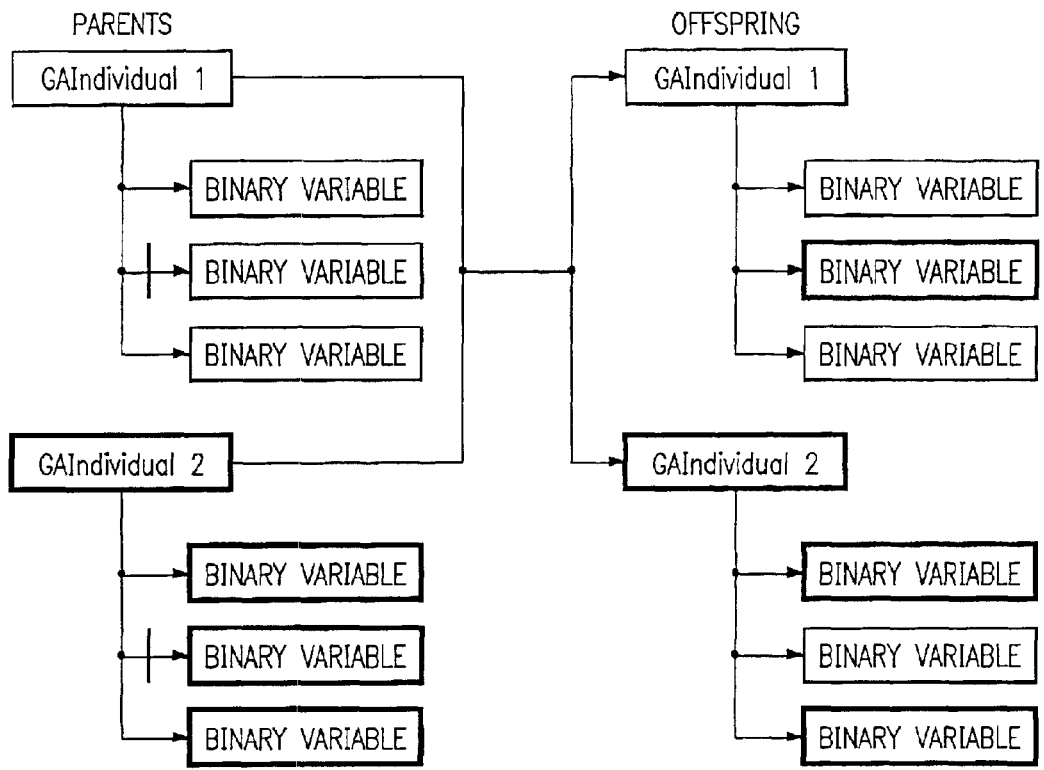
FIG. 9 is a flowchart of a node crossover in accordance with the XML genetic algorithm in accordance with the present invention.

Referring to FIG. 9, there is shown a node crossover performed by the XML genetic algorithm of the present invention. The actual performance of an XML genetic algorithm includes the possibility of many other operators as heretofore described. FIG. 9 is intended to explain one scenario of a selection.

As illustrated in FIG. 9, two "individuals" are selected from the population. Based on the XML background document, the genetic algorithm selects a crossover where all nodes are equally likely to be selected but only one is selected. As an extension of this only-one selection, the genetic algorithm may select nodes with different probabilities, resulting in more than one node selection. The cross node probability as defined in the XML document includes the directions for such multi-node selection. Based on the crossover probability (identified as crossover probability in the XML reference document), a crossover is performed based on a different input probability (called binary probability in the supporting XML document) and neither of the nodes are crossed as illustrated in FIG. 9.

Figure 10:
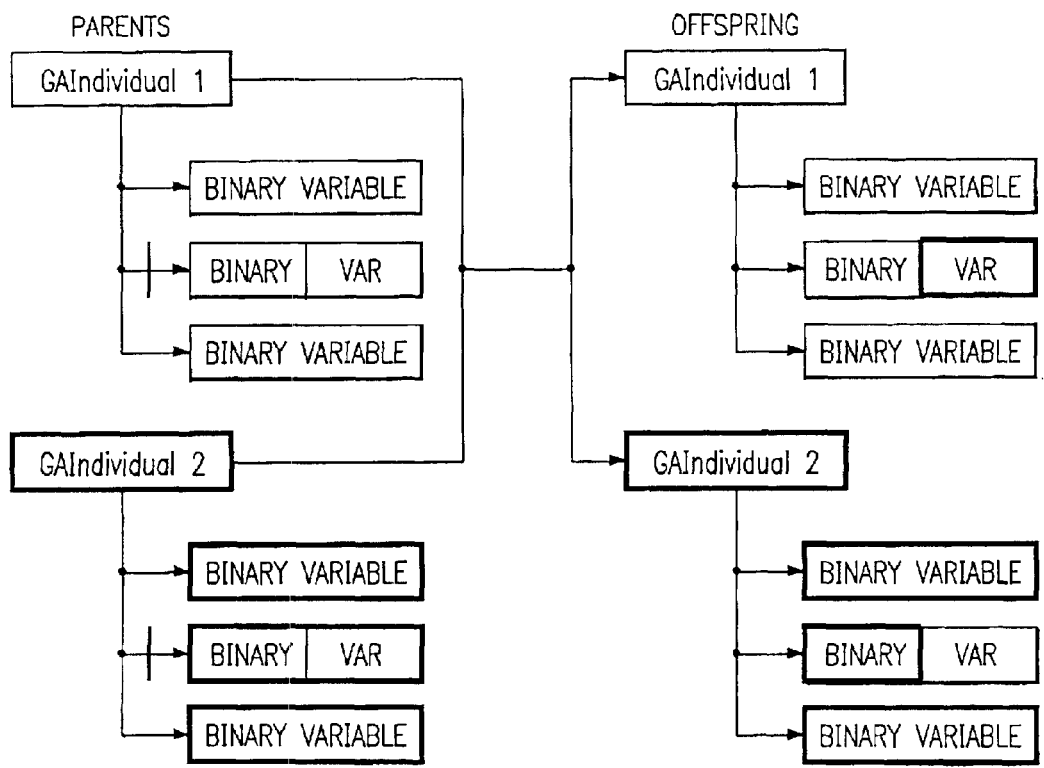
FIG. 10 is a flowchart of a node/traditional crossover in accordance with the XML genetic algorithm of the invention.

Referring to FIG. 10, in addition to node crossover, the XML genetic algorithm also performs node/traditional crossover. Node/traditional crossover is performed based on binary probability which identifies the probability that a node/traditional crossover is performed as illustrated in FIG. 8.

Figure 11:
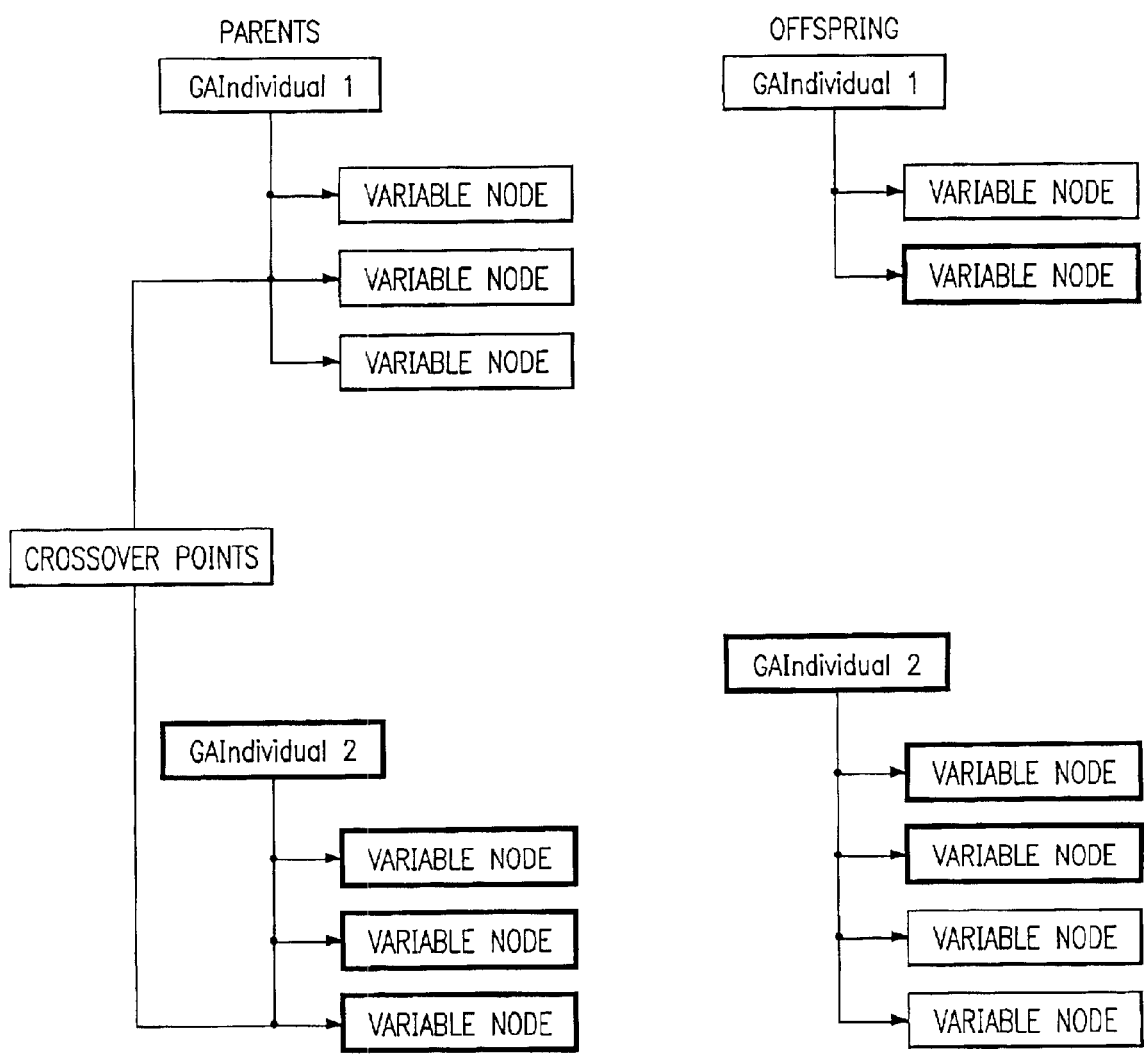
FIG. 11 is a flowchart of a crossover by XML element node.

Referring to FIG. 11, in addition to node crossover and node/traditional crossover, the XML genetic algorithm also performs a tree-node crossover. Tree-node crossover provides a means of crossover for nodes that are only crossed with other nodes of the same type. This type of crossover may involve switching randomly chosen nodes as illustrated in FIG. 8, or may require further crossover of the text data within a node, or there may be a requirement for editing in the case of problems that include constraints.

Referring to FIG. 12, there is illustrated a flowchart of a method for interfacing a genetic search algorithm to the web environment of the Internet. Initially, in routine 38, data elements are defined along with attributes and the rules for use thereof for an extensible markup language document. Again, it should be noted that the order of presentation of the method in FIG. 12 is not controlling in that the various routines may be performed in an order other than as illustrated in FIG. 12. In addition to defining data elements, the extensible markup language is stored in a document type definition file in routine 40. Elements from the document definition file are imported as nodes of the stored extensible markup language in routine 42. Data in the document is described in a routine 44 in a hierarchical format utilizing the stored extensible markup language. Data in the described document is imported to a genetic algorithm in routine 46 to define a data string or an individual in a population of points.

Although the present invention and its advantages have been described, it should be understood that various changes, substitutions, and alterations are possible without departing from the spirit and scope of the invention as defined in the appended claims.

What is claimed is:

1. A method for interfacing a computerized genetic search algorithm to the web environment of the Internet, comprising:
   - defining data elements, attributes and rules for use thereof for an extensible markup language;
   - storing the extensible markup language in a document type definition file on a computer;
   - describing data in a document, on the computer, in a hierarchical format utilizing the stored extensible markup language; and
   - importing the data in the document to a genetic algorithm comprising a randomized search algorithm to define a data string or an individual in a population of points, the population of points comprising a bit string encoded to represent the data or individual.

2. A method for interfacing a genetic search algorithm as in claim 1 wherein defining data elements, attributes and rules comprises defining a tree-based crossover operator.

3. A method for interfacing a genetic search algorithm as in claim 1 wherein defining data elements, attributes and rules comprises defining a mutation operator.

4. A method for interfacing a genetic search algorithm as in claim 3 further comprising importing elements from the document definition file as nodes of the stored extensible markup language.

5. A method for interfacing a genetic search algorithm as in claim 4 wherein defining a mutation operator comprises performing the mutation operator either at an internal or external node.

6. A method for interfacing a genetic search algorithm as in claim 1 wherein defining data elements, attributes and rules comprises defining a permutation operator, an editing operator, an encapsulation operator, and a dissemination operator.

7. A method for interfacing an extensible markup language computerized genetic search algorithm to the web environment of the Internet, comprising:
   - providing a genetic algorithm parameter document, on a computer, containing input data;
   - creating a population of individuals from the input data;
   - randomly generating documents, on the computer, conforming to the genetic algorithm individual DTD; and
   - providing utilities, on the computer, for performing crossover operations and/or mutation operations.

8. A method for interfacing a genetic search algorithm as in claim 7 wherein providing a parameter document comprises providing constraints for the created individuals.

9. A method for interfacing a genetic search algorithm as in claim 8 wherein providing constraints for the created individuals comprises providing one or more constraints from the group comprising: uniqueness, completeness and maximum and minimum values for nodes that contain text data.

10. A method for interfacing a genetic search algorithm as in claim 7 wherein creating a population of individuals comprises creating programs organized into a tree structure.

11. A method for interfacing a genetic search algorithm as in claim 10 wherein providing utilities comprises providing a crossover operator for structuring nodes of the tree structure.

12. A method for interfacing a genetic search algorithm as in claim 10 wherein providing utilities comprises providing a mutation operator for performing on either internal or external nodes of the tree structure.

13. A method for interfacing a genetic search algorithm as in claim 7 wherein providing utilities comprises providing a bit-wise crossover operator and/or a tree-node crossover operator.

14. A method for interfacing an extensible markup language computerized genetic search algorithm to the web environment of the Internet, comprising:
   - providing a genetic algorithm parameter document, on a computer, containing input data;
   - creating a population of individuals from the input data;
   - randomly generating documents, on the computer, conforming to the genetic algorithm individual DTD; and
   - providing utilities, on the computer, for performing one or more of the operators from the group comprising: crossover, mutation, permutation, editing, encapsulation, and dissemination.

15. A method for interfacing a genetic search algorithm as in claim 14 wherein providing utilities comprises providing a permutation operator for reordering the characters found between two selected points of a single individual.

16. A method for interfacing a genetic search algorithm as in claim 14 wherein providing utilities comprises providing an editing operator for recursively applying a pre-established set of editing rules to each individual member of the population.

17. A method for interfacing a genetic search algorithm as in claim 14 wherein creating a population of individuals comprises creating programs organized into a tree structure.

18. A method for interfacing a genetic search algorithm as in claim 17 wherein providing utilities comprises providing an encapsulation operator for identifying and naming potentially useful sub trees to enable referencing for later use.

19. A method for interfacing a genetic search algorithm as in claim 14 wherein providing utilities comprising providing a dissemination operator for ridding the population of individuals of low-fitness individuals in cases where the population of individuals becomes skewed and has a high proportion of such individuals.

20. A method for interfacing an extensible markup language computerized genetic search algorithm to the web environment of the Internet, comprising:
   - providing a genetic algorithm parameter document, on a computer, containing input data;
   - providing an XSL style sheet containing instruction for the genetic algorithm to construct a population of individuals;
   - creating a population of individuals from the input data in accordance with the instructions from the XSL style sheet;
   - randomly generating documents, on the computer, conforming to the genetic algorithm individual DTD;
   - providing a fitness function for the individuals of the created population; and
   - providing utilities, on the computer, for performing one or more of the operators selected from the group comprising: crossover, mutation, permutation, editing, encapsulation, and dissemination.

21. A method for interfacing a genetic search algorithm as in claim 20 wherein providing a parameter document comprises providing constraints for the created individuals.

22. A method for interfacing a genetic search algorithm as in claim 21 wherein providing constraints comprises providing one or more constraints from the group comprising: uniqueness, completeness, and maximum and minimum values for nodes that contain text data.

23. A method for interfacing a genetic search algorithm as in claim 20 wherein creating a population of individuals comprises creating programs organized into a tree structure.

24. A method for interfacing a genetic search algorithm as in claim 23 wherein providing utilities comprises providing a bit-wise crossover operator and/or a tree-node crossover operator.

* * * * *